UNITED STATES PATENT OFFICE.

CHARLES S. VADNER, OF BUTTE, MONTANA.

PROCESS FOR THE RECOVERY OF METALS FROM ORES AND THE LIKE.

1,207,243. Specification of Letters Patent. Patented Dec. 5, 1916.

No Drawing. Application filed May 23, 1916. Serial No. 99,465.

*To all whom it may concern:*

Be it known that I, CHARLES S. VADNER, a citizen of the United States, and a resident of Butte city, Silverbow county, Montana, have discovered a new and useful Process for the Recovery of Metals from Ores and the like, of which the following is a specification.

One of the objects of my invention is to provide an effective and inexpensive method of recovering metals from mineral matter and the like. To accomplish this object I make use of the heat and sulfurous gases contained in fumes, subjecting oxids, carbonates and sufficiently roasted ores containing copper, iron, arsenic, antimony, lime, sodium and manganese, in the presence of a sufficient quantity of water, to the action of these sulfurous gases.

It will be understood that if desirable in cases where sulfurous fumes are not available, sulfur, can be burnt in order to provide the necessary sulfurous gases for the reduction of ore.

Oxids, carbonates or sufficiently roasted ores are ground to the proper size and showered or sprayed in water down through the first of a series of solution towers. These towers are of suitable size and height according to the quantity of ore to be treated and the length of time the ore requires to be exposed. The sulfurous fumes are led into these solution towers and mingled with the sprayed ore pulp. By means of this spraying, every particle of ore is subjected to the action of the sulfurous gases, which, in the presence of water, effects the solution of the copper, some of the iron and arsenic contained as aforesaid in the ore. This solution falls to the sump at the bottom of the tower while the unused gases pass on to the next tower. The sulfurous fumes are drawn either by natural or artificial draft, in at the base of the first tower and by a suitable flue led down into the base of a second tower, thence up through the tower and down again to the base of the third tower and so on throughout the series of towers and finally out of the stack.

The solution towers are built over sumps into which the solution of ore and dissolved sulfurous vapors and undissolved ore falls. The solution is then oxidized with oxygen, or any suitable oxidizing agent until all of the iron contained in the solution is in the ferric condition. The solution is now cooled and treated in the cold. Finely ground calcium carbonate is now added to the solution until further addition of the same causes no effervescence. By this means the whole of the iron is precipitated as ferric hydrate which will react with any arsenic present to precipitate the same.

Where copper, zinc, silver and gold are to be extracted and eliminated, the addition of soluble chlorids, one or more, (the presence of which favors the solution of the above enumerated metals in the sulfurous solution, either by their own solvent powers or due to their presence in preventing secondary reactions from taking place that would tend to render the operation of the process more expensive, or in some cases, prohibitive) is desirable, and is made. I would not desire to limit myself to the above enumerated metals, but would use one or more, either separately or in combination, of the common soluble chlorid, such as sodium chlorid, magnesium chlorid, calcium chlorid, ferrous and ferric chlorid and cupric chlorid, in operating the process, either in the commencement of same, or at any stage, where the use of one or more of such chlorids would be advantageous in the extraction of any and all of the aforesaid metals from their ores.

The solution of the ore, as may be, having been satisfactorily accomplished, with the use of one or more of the soluble chlorids mentioned above, is separated from the insoluble residue by decantation or filtration into suitable containers and the excess of sulfurous gases is gotten rid of either by heat, steam or air, and the surplus acidity of the solution due to acid salts, free acid or otherwise, neutralized, partially or wholly as may be necessary, with the carbonates, oxids and hydrates of calcium, magnesium, sodium, potassium, or with a mixture of same, as may be possible.

When iron is present, the solution is partially neutralized and oxidized or not, as desired, with air, or any suitable oxidizing agent. The solution, hot or cold is then exposed in any suitable manner to the action of compressed air, oxygen, or a combination of the two. The iron contained in said solution can thus be partially or wholly precipitated as a brownish-red, pulverulent powder $Fe_2O_3$ (ferric acid), at will, by the operator, simply by regulating; 1st, the acidity of the solution; 2nd, the length of time of the treatment of the solution with air or oxygen; 3rd, the degree of strength of the solution of the soluble chlorids; especially while using sodium chlorid, calcium chlorid, or a mixture of the soluble chlorids; 4th, the temperature of the solution; 5th, the condition of the iron after it has been leached out of the ore and while in the leaching medium thus:

$$2FeSO_3 + SO_2 = Fe_2(SO_3)_3.$$
Ferrous sulfite = Ferric sulfite

The neutralizing agents added, take no part in the reaction, merely reducing the acidity of the solution thus:

$$SO_3 + H_2O + CaCO_3 = CaSO_3 + CO_2 + H_2O$$

Freshly precipitated ferric oxid is soluble in moderately strong acid solution, hence the necessity of reducing the acidity in order to obtain the precipitate.

In case the ores contain arsenic and it is desired to eliminate and recover it, a different method for precipitating the iron is used. The solution of the ore is effected and the excess of $SO_2$ gas is gotten rid of as above mentioned and the solution is oxidized or not, as may be desired, by a suitable oxidizing agent, and the iron is precipitated as ferric hydrate $Fe_2(OH)_6$ by the addition of a sufficient amount of the oxids, carbonates or hydrates, of barium, calcium, strontium, magnesium, sodium, or potassium, and mixtures of these can also be used. When the iron is precipitated in this form, the ferric hydrate $Fe_2(OH)_6$ formed, has the power of uniting with the arsenic present and forming either ferric arsenite or ferric arsenate, as may be, which is precipitated and removed by filtration or other suitable ways from the solution.

It is well understood that any and all steps in this process can be carried out in the presence of heat or cold, as may be most advantageous. The condition of the solution as to the amount of free acid and state of oxidization can be regulated to suit the best purpose of the application of the process.

It is my intention of effecting the functioning of this process for the purpose of cheapness of operation, by, 1st, using $SO_2$ gas and water; 2nd, using $SO_2$ gas, water and heat; 3rd, using $SO_2$ gas and water and soluble chlorid, and a mixture of soluble chlorid as aforementioned, along with heat when necessary, or by using a mixture of soluble chlorids, 4th, using the above means separately, in part, or in combination, also using the soluble chlorids mentioned separately, in part, or in combination for the purpose of extracting the metals aforementioned. The strength of the solution in soluble chlorids will vary from ¼% to saturation as may be.

The copper being in solution in the form of $Cu_2SO_3$ (cuprous sulfite) no addition of $SO_2$ gas is necessary, thus (Cuprous sulfite) $Cu_2SO_3 + 2NaCl$ + sufficient heat =
(Cuprous chlorid) $2CuCl + Na_2SO_3$ (sodium sulfite)

and, $$Na_2SO_3 + O = Na_2SO_4.$$

Copper is recovered by solution of its ores in presence of a soluble chlorid as aforementioned, with sufficient heat to form the sulfite, purifying the solution of any objectionable metal, as aforementioned, heating sufficiently, eliminating the cuprous chlorid and recovering the copper by any means such as cementation, smelting or electrolysis, excess acidity of solution may be removed by suitable means as aforementioned at any state to facilitate the desired reaction.

Oxidization of the solution is effected during various stages of the process by any suitable oxidizing agent, with or without the presence of mineral matter, that tend to promote by their presence such oxidization, so that the formation of sodium sulfate is promoted and recovered, cooling of the solution is effective in precipitating said salt from the solution.

Having thus described by process what I claim is—

1. In the art of recovering copper and other metals from mineral matter and the like consisting in treating the naturally oxidized or sufficiently roasted sulfid ore with sulfurous gases and the like in the presence of heat and a solution containing at least one of the common chlorids that can react, for the purpose of effecting the desired reactions, leaching out the metals from the mineral matter eliminating excess acidity of solution, passing air through same thereby precipitating iron as ferric oxid, eliminating same, further eliminating excess acidity of solution and sufficiently heating same whereby copper is precipitated as cuprous chlorid.

2. In the art of recovering copper and other metals from mineral matter and the like consisting in treating the naturally oxidized or sufficiently roasted sulfid ore with sulfurous gases and the like in the presence of heat and a solution containing at least one of the common chlorids that can react, for the purpose of effecting the desired reactions, leaching out the metals from the mineral matter eliminating excess acidity of solution by suitable means, sufficiently heating the solution to precipitate the copper as cuprous chlorid, eliminating the cuprous chlorid and recovering the copper.

3. In the art of recovering copper and other metals from mineral matter and the like consisting in treating the naturally oxidized or sufficiently roasted sulfid ore with sulfurous gases and the like in the presence of heat and a solution containing at least one of the common chlorids that can react, for the purpose of effecting the desired reactions, leaching out the metals from the mineral matter eliminating excess of $SO_2$ gas, sufficiently oxidizing the solution and treating same with the carbonate of a metal whereby the ferric hydrate formed reacts with any arsenic present eliminating same from the solution, sufficiently heating the solution to precipitate and recover the copper as cuprous chlorid.

4. In the art of recovering copper and other metals from mineral matter and the like consisting in treating the naturally oxidized or sufficiently roasted sulfid ore with sulfurous gases and the like in the presence of heat and a solution containing at least one of the common chlorids that can react, for the purpose of effecting the desired reactions, leaching out the metals from the mineral matter eliminating excess of $SO_2$ gas by suitable means, partially eliminating excess acidity of solution by neutralization; passing air through same thereby precipitating iron, eliminating same, adding sufficient additional neutralizing agent whereby the passage of more air through the solution completely precipitates the iron as ferric oxid, eliminating the ferric oxid and sufficiently heating the solution meanwhile neutralizing any excess acidity of solution, whereby copper is precipitated as cuprous chlorid, eliminating the cuprous chlorid and recovering the copper.

5. In the art of recovering copper and other metals from mineral matter and the like consisting in treating the naturally oxidized or sufficiently roasted sulfid ore with sulfurous gases and the like in the presence of heat and a solution containing at least one of the common chlorids that can react, for the purpose of effecting the desired reactions, leaching out the metals from the mineral matter eliminating excess acidity of solution, passing air through same thereby precipitating iron as ferric oxid, eliminating same, further eliminating excess acidity of solution, sufficiently heating same whereby copper is precipitated as cuprous chlorid, cooling the solution and recovering the sodium sulfate.

6. In the art of recovering copper and other metals from mineral matter and the like consisting in treating the naturally oxidized or sufficiently roasted sulfid ore with sulfurous gases and the like in the presence of heat and a solution containing at least one of the common chlorids that can react, for the purpose of effecting the desired reactions, leaching out the metals from the mineral matter eliminating excess acidity of solution by suitable means sufficiently heating the solution to precipitate the copper as cuprous chlorid, cooling the solution and recovering the sodium sulfate.

7. In the art of recovering copper and other metals from mineral matter and the like consisting in treating the naturally oxidized or sufficiently roasted sulfid ore with sulfurous gases and the like in the presence of heat and a solution containing at least one of the common chlorids that can react, for the purposes of effecting the desired reactions, leaching out the metals from the mineral matter eliminating excess of $SO_2$ gas by suitable means, partially eliminating excess acidity of solution by neutralization; passing air through same thereby precipitating iron, eliminating same, adding sufficient additional neutralizing agent whereby the passage of more air through the solution completely precipitates the iron as ferric oxid, eliminating the ferric oxid and sufficiently heating the solution meanwhile neutralizing any excess acidity of solution, whereby copper is precipitated as cuprous chlorid, eliminating the cuprous chlorid and recovering the copper, cooling the solution and recovering the sodium sulfate.

In witness whereof, I have hereunto set my hand in the presence of two subscribing witnesses.

CHARLES S. VADNER.

Witnesses:
 MURRAY SHEPHERD,
 DONNA MARGETTS.